United States Patent [19]

Shramawick et al.

[11] Patent Number: 5,575,665
[45] Date of Patent: Nov. 19, 1996

[54] PATCH PANEL WITH HINGED TIE BAR

[75] Inventors: John G. Shramawick, Weaverville; R. Bruce Smith, Asheville, both of N.C.

[73] Assignee: Superior Modular Products Incorporated, Swannanoa, N.C.

[21] Appl. No.: 565,980

[22] Filed: Dec. 1, 1995

[51] Int. Cl.$^6$ .................................................. H01R 9/24
[52] U.S. Cl. .................................................. 439/49; 439/713
[58] Field of Search ........................ 439/49, 713, 719, 439/942

[56]  References Cited

U.S. PATENT DOCUMENTS 3,199,068  8/1965  Neenan ............................ 439/713
4,160,880  7/1979  Brey ................................. 439/49
5,145,380  9/1992  Holcomb et al. ................. 439/49
5,156,551  10/1992  Unger et al. ..................... 439/49
5,401,193  3/1995  Lo Cicero et al. ............... 439/713

Primary Examiner—Neil Abrams
Assistant Examiner—Christopher Goins
Attorney, Agent, or Firm—Carter & Schnedler

[57] ABSTRACT

There is provided a patch panel having a plurality of rows of wire termination connectors mounted to one side of a circuit board. A plurality of jacks, which are mounted to the other side of the circuit board, extend through the patch panel face plate. A cable tie bar is rotatably attached to the patch panel by a pair of hinges so that the cable tie bar may be rotated to various positions with respect to the wire termination connectors providing unimpaired access to all of the connectors.

13 Claims, 6 Drawing Sheets

PATCH PANEL WITH HINGED TIE BAR

BACKGROUND OF THE INVENTION

This invention relates to patch panels.

More particularly, it relates to patch panels having cable tie bars.

Patch panels are utilized in the telecommunication industry to connect customer premises telephone lines or data lines to user station wiring. These patch panels are formed by a sheet metal enclosure having a face plate with apertures therein. Normally, four modules, each including a circuit board, are mounted inside the patch panel. Each module includes a row of F.C.C. jacks which are mounted to one side of the circuit board and which extend through the apertures in the face plate. Two rows of wire termination connectors are normally mounted on the other side of each circuit board thereby forming two inner and two outer rows of wire termination connectors within the patch panel. These wire termination connectors often are AT&T 110 type connectors or Krone LSA type connectors. The wire termination connectors are used to terminate the insulated conductors providing service to work stations. Terminations of the insulated conductors are done by a craftsman who often utilizes a special termination tool to force the insulated conductors into slots in the 110 or Krone LSA connectors, which slots receive insulation displacement contacts.

In many instances, a cable tie bar is attached to the patch panel. The tie bar provides a location for the incoming cables to be secured for (a) cable management, (b) maintaining minimal bend radius, and (c) strain relief. In addition, the cable tie bar may provide a cable shield bonding area for shielded cables. The cable tie bar is normally mounted at a central location over the back side of the patch panel, which is normally directly over the two inner rows of insulation of wire termination connectors. Because this location of the tie bar blocks the two inner rows of wire termination connectors and because of the high density of the connections made on the circuit boards, craftsmen have found it difficult to terminate the incoming insulated conductors to the inner rows of the 110 or Krone LSA wire termination connectors.

OBJECTS OF THE INVENTION

It is therefore one object of this invention to provide an improved patch panel.

It is another object of this invention to provide a patch panel having a cable tie bar which permits one to readily terminate incoming conductors to a common electrical bus located within the patch panel.

SUMMARY OF THE INVENTION

In accordance with one form of this invention, there is provided a patch panel which includes a face plate having at least one aperture therein for receiving a plurality of jacks. At least one circuit board is mounted to the face plate. The jacks are mounted on one side of the circuit board and a plurality of wire termination connectors are mounted in rows on the other side of the circuit board. The wire termination connectors form at least one inner row and at least one outer row. First and a second brackets are attached to the face plate. A cable tie bar is rotatably attached to the first and second brackets, whereby the cable tie bar may be rotated to various positions with respect to the wire termination connectors, so as to provide unimpaired access to the wire termination connectors.

Preferably a pair of hinges are formed between the cable tie bar and the first and second brackets. It is also preferred that each hinge includes at least one resilient grommet so that the tie bar will be held in a predetermined position after having been rotated so that the tie bar will not interfere with the craftsman while he is terminating conductors to the inner row of wire termination connectors, i.e., the tie bar is out of the way.

BRIEF DESCRIPTION OF THE DRAWINGS

The subject matter which is regarded as the invention is set forth in the appended claims. The invention itself, however, together with further objects and advantages thereof may be better understood in reference to the accompanying drawings in which:

DESCRIPTION OF THE PREFERRED EMBODIMENT

Figure 1:
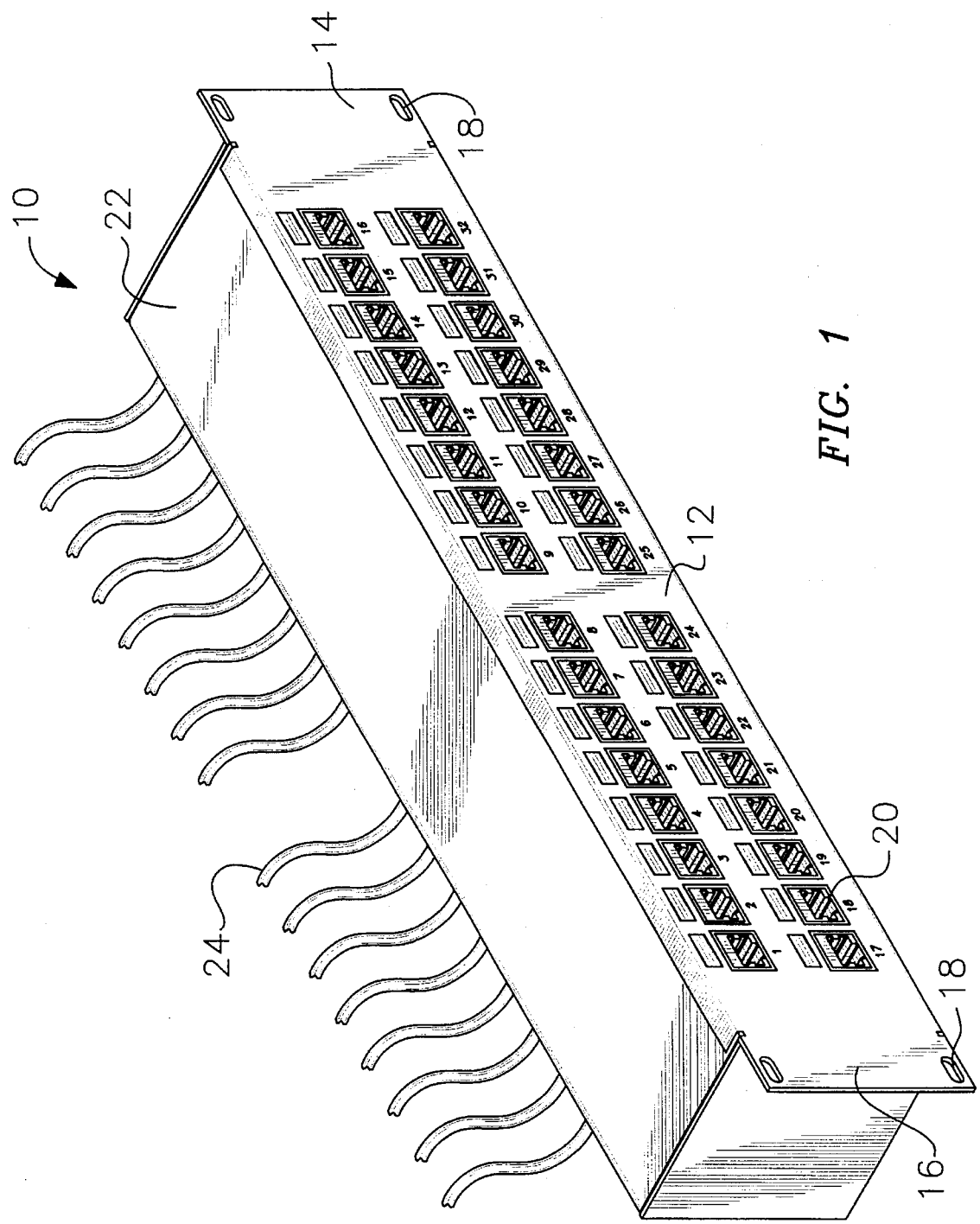
FIG. 1 is a pictorial view of a patch panel.

Referring now more particularly to FIG. 1, there is provided patch panel 10 having face plate 12 with a pair of side extensions 14 and 16. Side extensions 14 and 16 include four mounting holes 18 to secure the patch panel to an appropriate structure which is located near incoming telephone cables. The face plate 12 includes a plurality of apertures 20, each receiving F.C.C. type modular jacks. The patch panel further includes a removable rear cover panel 22. A plurality of cables 24 extend into the rear of the patch panel.

Figure 2:
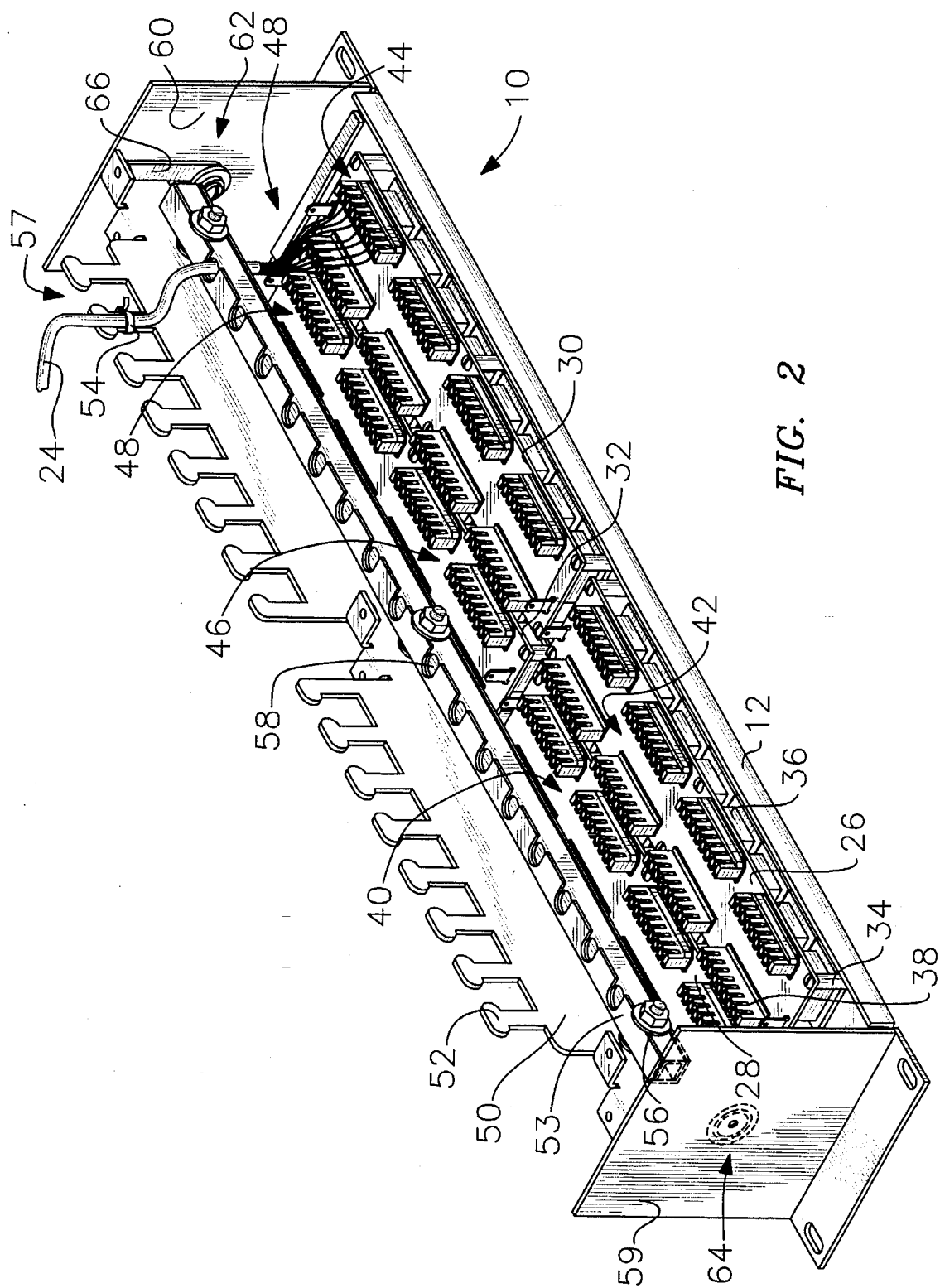
FIG. 2 is a pictorial view of the patch panel of FIG. 1 in accordance with the present invention with the rear cover plate having been removed.

Referring now more particularly to FIG. 2, which shows patch panel 10 with the cover 22 having been removed, four circuit boards 26, 28, 30 and 32 are mounted to face plate 12 by screws 34. Jacks 36 are mounted to one side of the circuit boards. Jacks 36 extend through apertures 20 to the other side of the face plate, as shown in FIG. 1. The jacks are not shown mounted to circuit board 32 for ease of illustration.

A plurality of AT&T type 110 or Krone LSA wire termination connectors 38 are mounted on the other side of each circuit board. The wire termination connectors 38 form a pair of inner rows 40 and 42 and a pair of outer rows 44 and 46 within the patch panel. The wire termination connectors 38 terminate individual insulated conductors 48 which are received in cables 24. For ease of illustration, the wire termination connectors which are mounted on circuit board 28 and 30 are not shown terminated to insulated conductors.

In order to provide cable management, to maintain minimum bend radius for the cable, and for strain relief, a cable tie bar 50 is attached to the patch panel. Tie bar 50 includes a plurality of dovetails 52 extending therefrom. Dovetails 52 are used to secure the cables 24 to the tie bar in an organized fashion by utilizing cable ties 54.

Figure 3:
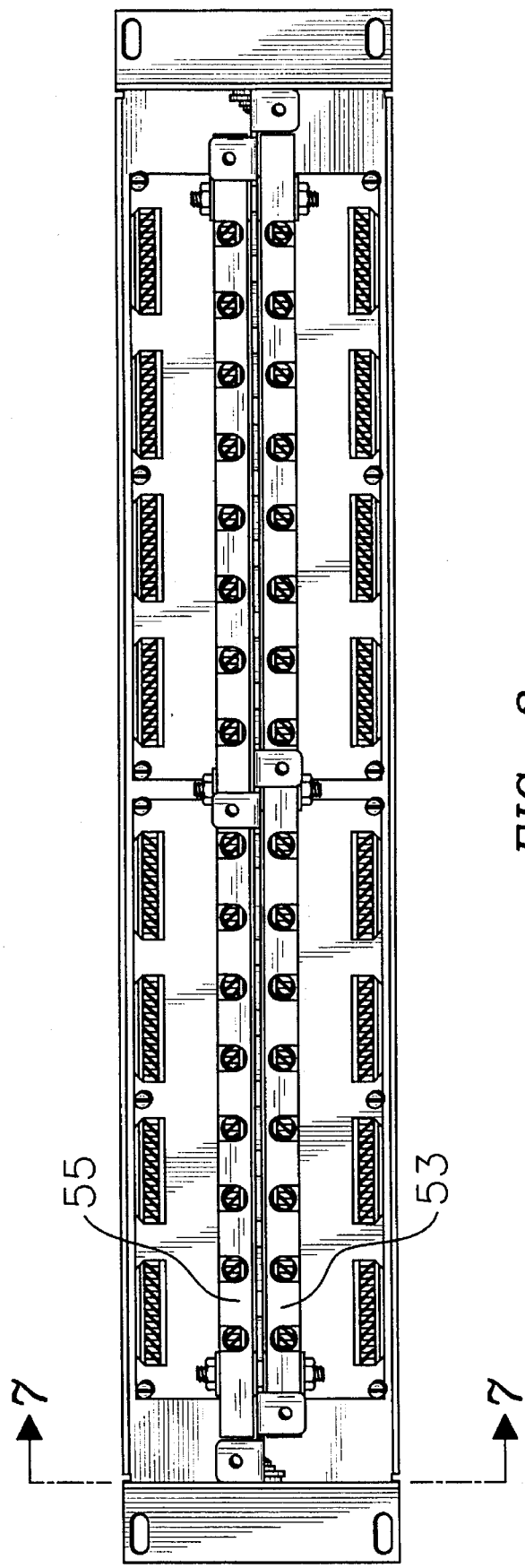
FIG. 3 is a top view of the patch panel of FIG. 2 with the cable tie bar in the normal position.

Referring now to FIG. 3 as well as to FIG. 2, a pair of hollow organizing bars 53 and 55 are mounted on opposing sides of the tie bar 50. Tie bar 50 and organizing bars 53 and 55 form tie bar assembly 57. Organizing bars 53 and 55 are mounted to the tie bar 50 by screws 56. Organizing bars 53 and 55 include a plurality of apertures 58, each receiving an individual cable 24. As illustrated, some of the apertures 58 are not shown with a cable for clarity.

Figure 4:
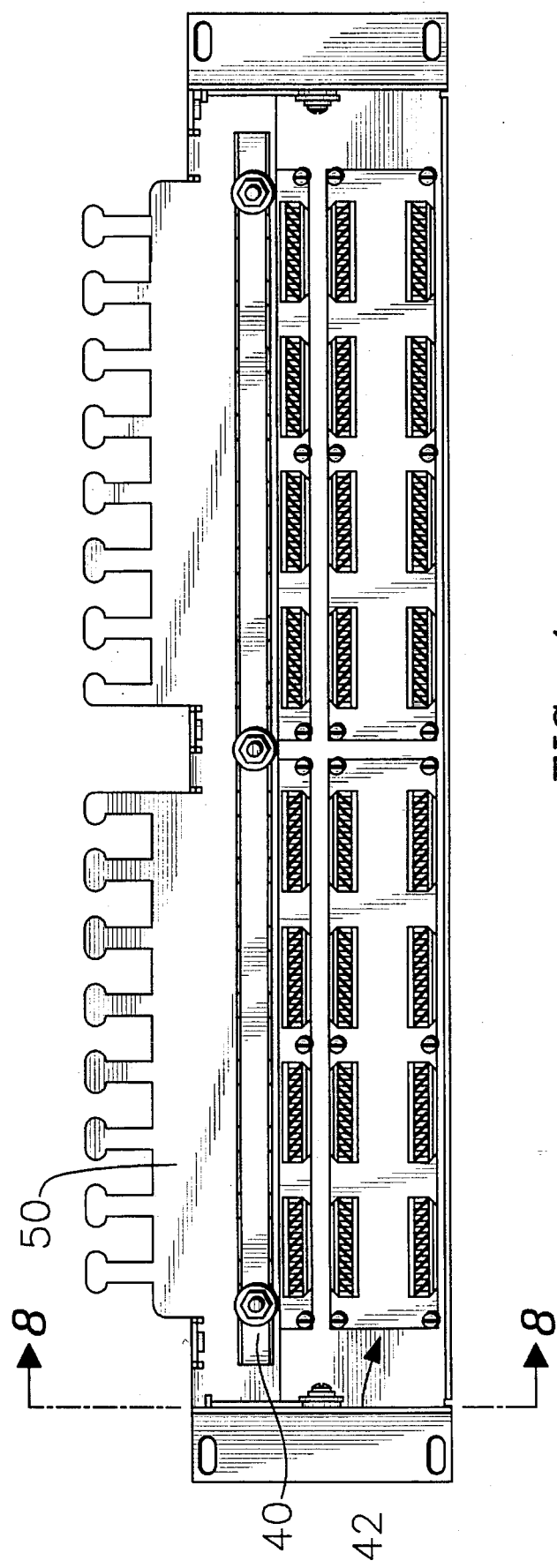
FIG. 4 is a top view of the apparatus of FIG. 2, however with the cable tie bar having been rotated to provide access to one of the inner rows of wire termination connectors.

Brackets 59 and 60 are connected to face plate 12. Tie bar 50 is rotatably mounted to brackets 59 and 60 by means of a pair of hinges 62 and 64. As shown in FIG. 4, by utilizing hinges 62 and 64, tie bar 50 may be rotated in one direction, as shown in FIG. 4, so that inner row 42 of wire termination connectors 38 becomes fully accessible to the craftsman who terminates conductors 48 to wire termination connectors 38. Likewise, by utilizing this hinge construction, tie bar 50 may be rotated in the opposite direction to that shown in FIG. 4 so that row 40 of the wire termination connectors are fully exposed, again, so that the craftsman may make the terminations without being impaired by the tie bar.

Figure 5:
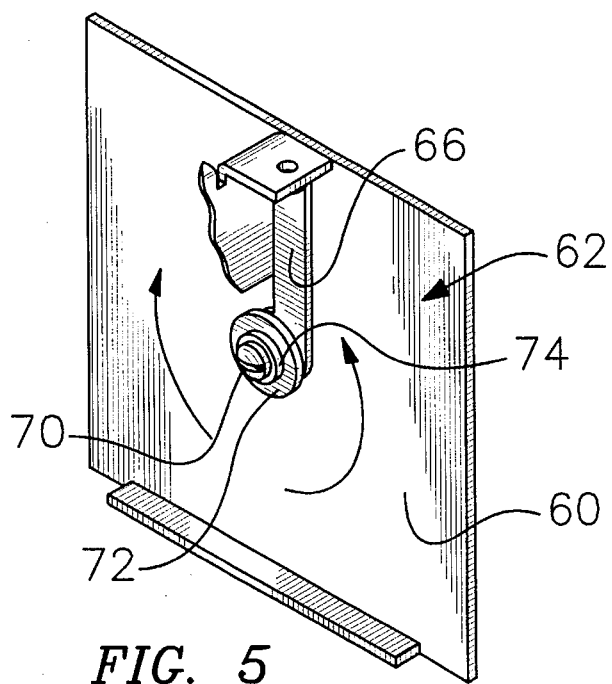
FIG. 5 is a pictorial view of one of the brackets of FIG. 2 to which the cable tie bar is mounted showing the hinge construction.
Figure 6:
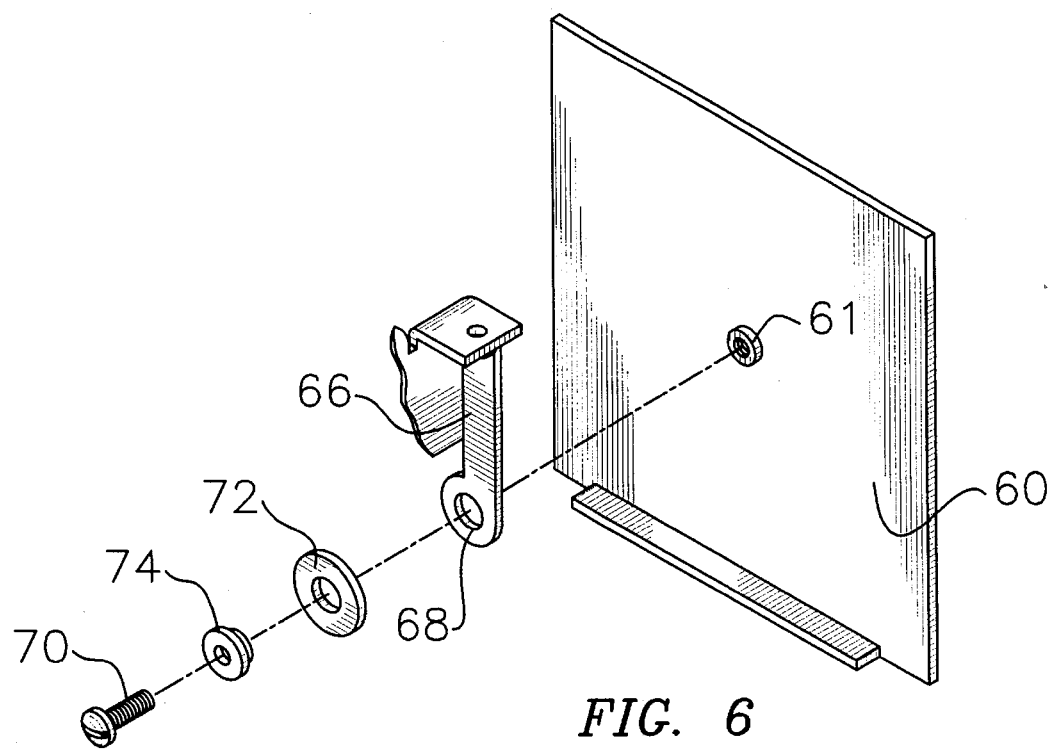
FIG. 6 is an exploded view of the apparatus of FIG. 5.
Figure 7:
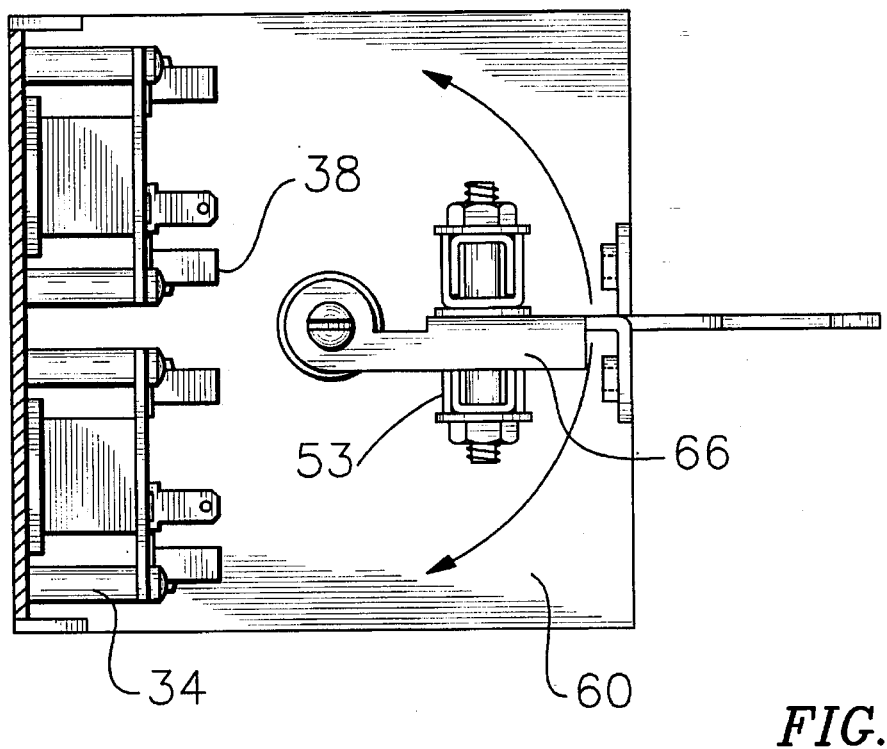
FIG. 7 is a sectional view of a portion of the apparatus of FIG. 3 taken through section line 7—7.
Figure 8:
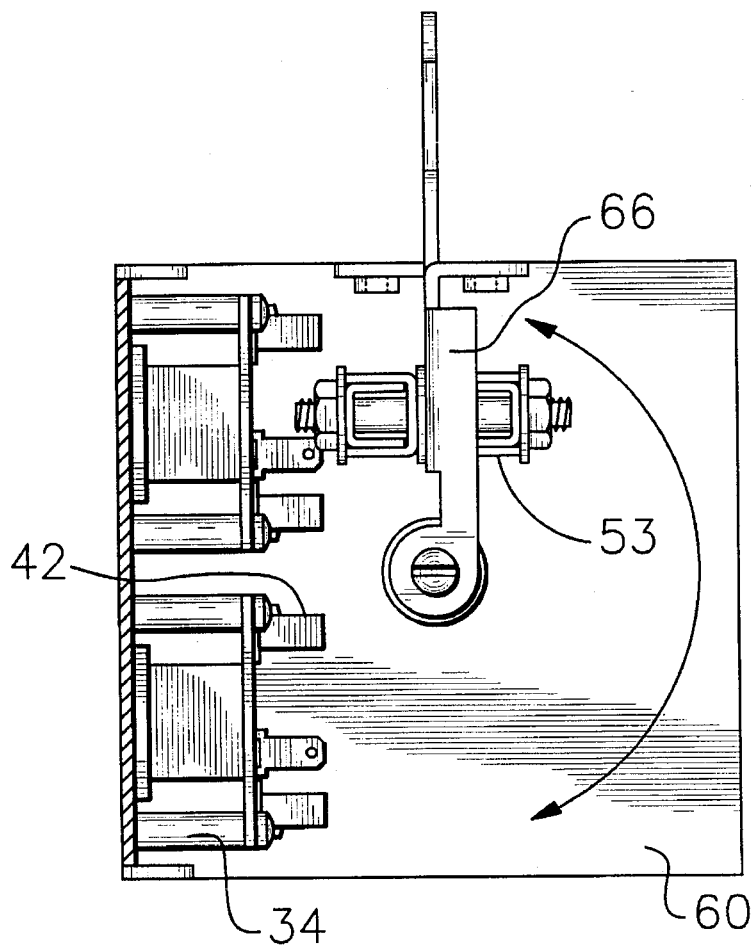
FIG. 8 is a sectional view of a portion of the apparatus of FIG. 4 taken through section line 8—8.

FIGS. 5 and 6 show the details of the construction of the hinges 62 and 64. For simplification, since the two hinges are identical, only hinge 62 will be described. Hinge 62 includes extension beam 66 which is integral with tie bar 50 and is formed at a right angle to the tie bar. The tie bar assembly 57 is extended away from the axis of rotation of the hinges 62 and 64 by extension beam 66 so that the tie bar assembly will not obstruct the inner rows 40 and 42 of the connectors when sufficiently rotated.

Extension beam 66 includes eyelet 68 which receives threaded screw 70. A first resilient grommet 72, which also has an eyelet therein, contacts beam 66 about the periphery of eyelet 68. A second resilient grommet 74, which also has an eyelet therein, contacts the head of screw 70 and grommet 72. Preferably, grommets 72 and 74 are made of nylon or neoprene. Plate 60 includes a small aperture 61 therein for receiving the threaded portion of screw 70.

With the screw being tightened onto the resilient grommets 72 and 74, the grommets hold tie bar 50 in position while permitting the craftsman to rotate the tie bar by hand in directions indicated by the curved arrows shown in FIG. 5. The tie bar will be held in position, as shown in FIG. 4, while the craftsman terminates insulated conductors 48 to the respective wire termination connectors 38.

Once the craftsman has completed all of the terminations on one inner row, for example, inner row 42, he then rotates the tie bar in the opposite direction and terminates the connectors in inner row 40. After completion of all terminations, the craftsman then returns the tie bar to its upright neutral position, as shown in FIGS. 2 and 3, and replaces the cover 20 on the patch panel.

Thus there is provided an improved patch panel which enables a craftsman to more readily and conveniently terminate insulated conductors to wire termination connectors without the need to physically remove the cable tie bar.

From the foregoing description of the preferred embodiment of the invention, it will be apparent that many modifications may be made therein. It will be understood, however, that this embodiment of the invention is an exemplification of the invention only and that the invention is not limited thereto. It is to be understood therefore that it is intended in the appended claims to cover all modifications as fall within the true spirit and scope of the invention.

What is claimed is:

1. A patch panel comprising:
   a face plate having at least one aperture therein for receiving a plurality of jacks;
   at least one circuit board mounted to said face plate;
   said jacks mounted to one side of said circuit board;
   a plurality of wire termination connectors mounted in rows to the other side of said circuit board; said wire termination connectors forming at least one inner row and at least one outer row;
   first and second brackets attached to said face plate;
   a cable tie bar rotatably attached to said first and second brackets, whereby said cable tie bar may be rotated to various positions with respect to said wire termination connectors for providing unimpaired access to said connectors.

2. A patch panel as set forth in claim 1, wherein said tie bar is connected to said brackets by a pair of hinges.

3. A patch panel as set forth in claim 2, wherein each of said hinges includes at least one resilient grommet, whereby said tie bar will be held in a predetermined position after having been rotated.

4. A patch panel as set forth in claim 3, wherein each of said hinges includes a pair of resilient grommets contacting one another.

5. A patch panel as set forth in claim 2, wherein each of said hinges includes a finger extending from said tie bar; said beam having an aperture therein.

6. A patch panel as set forth in claim 5, wherein said tie bar is located away from the axis of rotation of said hinge.

7. A patch panel as set forth in claim 5, wherein each of said hinges includes a pair of grommets, each having apertures therein, and a screw; said beam being rotatable while said grommets and said screw remain stationary.

8. A patch panel as set forth in claim 1, wherein said tie bar includes a plurality of tails extending therefrom; said tails for securing cable thereto.

9. A patch panel as set forth in claim 8, wherein said tie bar includes a pair of organizing bars attached thereto; said organizing bars including a plurality of apertures for receiving cable.

10. A patch panel as set forth in claim 1, further including two inner rows of wire termination connectors and two outer rows of wire termination connectors, wherein when said tie bar is rotated in one direction, one of said inner rows is accessible and when said tie bar is rotated in the other direction, the other of said inner row is accessible.

11. A patch panel as set forth in claim 1, further including four circuit boards, each including a plurality of jacks and a plurality of wire termination connectors.

12. A patch panel as set forth in claim 1, further including a plurality of apertures in said face plate; each of said apertures receiving an individual jack.

13. A patch panel comprising:
   a face plate having a plurality of apertures therein for receiving a corresponding plurality of jacks;
   a plurality of circuit boards mounted to said face plate;
   said jacks mounted to one side of said circuit boards;
   a plurality of wire termination connectors mounted in rows to the other side of said circuit boards; said wire termination connectors forming a pair of inner rows and a pair of outer rows;
   first and second brackets attached to said face plate;
   a cable tie bar; said cable tie bar including a plurality of tails extending therefrom for securing cables thereto;

said cable tie bar being rotatably attached to said first and second brackets by a pair of hinges;

each of said hinges including at least one resilient grommet, whereby said cable tie bar is rotatable in one direction to a position with respect to said inner rows of wire termination connectors and being held in said position, thereby providing unimpaired access to one of said inner rows of said wire termination connectors, and being rotatable in the opposite direction and held in a second position, thereby providing unimpaired access to the other of said inner rows of wire termination connectors.

* * * * *